United States Patent
Law et al.

(10) Patent No.: US 11,396,070 B2
(45) Date of Patent: Jul. 26, 2022

(54) APPARATUS AND METHOD FOR FACILITATING FASTENING OF FASTENERS

(71) Applicant: Gulfstream Aerospace Corporation, Savannah, GA (US)

(72) Inventors: Kyle Law, Savannah, GA (US); Shane Ellison, Savannah, GA (US); Jerry Trenary, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/847,901

(22) Filed: Apr. 14, 2020

(65) Prior Publication Data

US 2021/0316410 A1    Oct. 14, 2021

(51) Int. Cl.
*B23P 19/06* (2006.01)
*B25B 13/08* (2006.01)

(52) U.S. Cl.
CPC .............. *B23P 19/06* (2013.01); *B25B 13/08* (2013.01)

(58) Field of Classification Search
CPC ....................................................... B25B 13/08
USPC ................................................ 81/119, 125.1
See application file for complete search history.

(56) References Cited

U.S. PATENT DOCUMENTS

| | | | | |
|---|---|---|---|---|
| 135,084 A | * | 1/1873 | Cooper ................... | B25B 13/08 81/125.1 |
| 1,512,559 A | * | 10/1924 | Moore .................... | B25B 13/16 81/165 |
| 2,332,602 A | * | 10/1943 | Rosenbloom ........... | B25B 13/08 81/125.1 |
| 2,612,068 A | * | 9/1952 | Heumader .............. | B25B 13/08 81/119 |
| 2,640,382 A | * | 6/1953 | Grossman ........... | B25B 27/0042 81/119 |
| 4,649,613 A | * | 3/1987 | Bednarik ........... | B23K 11/3072 29/253 |
| 6,715,383 B1 | * | 4/2004 | Hsien ..................... | B25B 13/08 81/119 |
| 7,066,057 B2 | * | 6/2006 | Hsien ..................... | B25B 13/08 81/119 |
| 7,093,520 B2 | * | 8/2006 | Tuanmu ................. | B25B 13/04 81/177.1 |
| 7,409,893 B2 | | 8/2008 | Maymon | |
| 2006/0027051 A1 | | 2/2006 | Hsien | |

FOREIGN PATENT DOCUMENTS

GB         2348841 A         10/2000

* cited by examiner

*Primary Examiner* — Jason L Vaughan
(74) *Attorney, Agent, or Firm* — LKGlobal | Lorenz & Kopf, LLP

(57) ABSTRACT

Apparatuses and methods for facilitating fastening of a fastener are provided. In one example, the apparatus includes a body portion that extends distally from a body proximal portion to a body distal portion. A head portion extends distally from the body distal portion. A first prong that extends distally from a first prong proximal section that has a first thickness to a first prong distal section that has a second thickness that is less than the first thickness. A second prong that extends distally from a second prong proximal section that has a third thickness to a second prong distal section that has a fourth thickness that is less than the third thickness. The second prong is spaced apart from the first prong to define a gap therebetween that is configured to receive the fastener.

20 Claims, 3 Drawing Sheets

APPARATUS AND METHOD FOR FACILITATING FASTENING OF FASTENERS

TECHNICAL FIELD

The technical field relates generally to fasteners, and more particularly, relates to apparatuses and methods for facilitating fastening of fasteners, such as, for example, to tighten and/or loosen a fastener or the like.

BACKGROUND

There are a vast number of different fasteners for various applications but in general, fasteners are commonly used to hold one or more structures and/or components together and/or in place. For example, p-clamps are a type of fastener that can be used to hold a flexible component to a structure. P-clamps typically include a ring portion and a flange or clamp portion that extends from the ring portion and that can be fastened to a structure(s) and/or surface(s) with a bolt, screw, other threaded fastener, nail, or the like. The clamp portion of the p-clamp includes two flanges or segments that each define a hole formed therethrough that together can receive, for example, the shaft or body portion of a threaded fastener or the like for fastening to a structure. When the p-clamp is fastened to a structure, the holes of the two segments are aligned such that the body portion of the threaded fastener is disposed directly through the holes and into the structure. As the threaded fastener is rotated or tightened to further engage the structure, the ring portion of the p-clamp is pulled together or constricts to hold a component(s) such as wires while the clamp portion becomes firmly secured to the structure via the threaded fastener.

P-clamps are installed, for example, by applying a force using a wrench (e.g., socket wrench) that rotates the threaded fastener and advances the body portion of the threaded fastener through the segments' holes and into the structure. However, the rotational force applied by the wrench can also rotate the p-clamp while it is being installed. Because of this, it is common for an installer to use their hand(s) to hold the p-clamp in place while it is fastened to the structure. Unfortunately, it can take a lot of force to prevent the p-clamp from rotating during the installation process. As such, the installer often must hold the p-clamp very firmly with their fingers to prevent rotational motion of the p-clamp during installation. This can be very taxing on the installer, especially when several p-clamps (e.g., hundreds or more) are being installed, for example, by the same installer on a given day.

Accordingly, it is desirable to provide apparatuses and methods for facilitating fastening of a fastener that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an apparatus and a method for facilitating fastening of a fastener are provided herein.

In a first non-limiting embodiment, the apparatus includes, but is not limited to, a body portion that extends distally from a body proximal portion to a body distal portion. The apparatus further includes, but is not limited to, a head portion that extends distally from the body distal portion. The head portion includes a first prong that extends distally from a first prong proximal section that has a first thickness to a first prong distal section that has a second thickness that is less than the first thickness. The head portion further includes a second prong that extends distally from a second prong proximal section that has a third thickness to a second prong distal section that has a fourth thickness that is less than the third thickness. The second prong is spaced apart from the first prong to define a gap therebetween that is configured to receive the fastener.

In another non-limiting embodiment, the apparatus includes, but is not limited to, a body portion that extends distally from a body proximal portion to a body distal portion. The body portion includes a handle section that extends distally from the body proximal portion to a handle distal portion to define a first longitudinal axis. The body portion further includes a neck section that extends from the handle distal portion to the body distal portion. The apparatus further includes, but is not limited to, a head portion that extends distally from the body distal portion to define a second longitudinal axis. The head portion includes a first prong that extends distally from a first prong proximal section that has a first thickness to a first prong distal section that has a second thickness that is less than the first thickness. The head portion further includes a second prong that extends distally from a second prong proximal section that has a third thickness to a second prong distal section that has a fourth thickness that is less than the third thickness. The second prong is spaced apart from the first prong to define a gap therebetween that is configured to receive a fastener. The first thickness and the third thickness are substantially identical. The second thickness and the fourth thickness are substantially identical. The neck section is stepped between the first longitudinal axis and the second longitudinal axis.

In another non-limiting embodiment, the method includes, but is not limited to, obtaining an apparatus. The apparatus includes a body portion that extends distally from a body proximal portion to a body distal portion. The apparatus further includes a head portion that extends distally from the body distal portion. The head portion includes a first prong that extends distally from a first prong proximal portion that has a first thickness to a first prong distal portion that has a second thickness that is less than the first thickness. The head portion further includes a second prong that extends distally from a second prong proximal portion that has a third thickness to a second prong distal portion that has a fourth thickness that is less than the third thickness. The second prong is spaced apart from the first prong to define a gap therebetween. The method further includes, but is not limited to, receiving a portion of the fastener into the gap such that the first prong and the second prong engage the portion of the fastener.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 3:
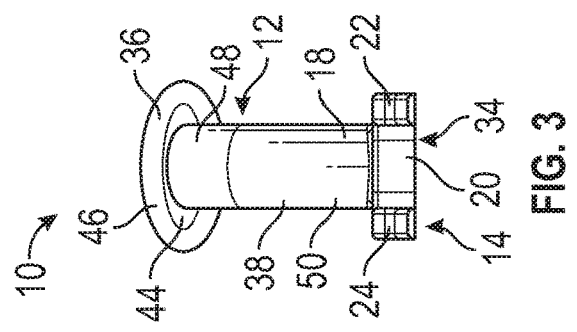
FIG. 3 illustrates a front view of the apparatus for facilitating fastening of a fastener in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses for facilitating fastening of a fastener. The exemplary embodiments taught herein provide an apparatus that includes a body portion that extends distally from a body proximal portion to a body distal portion. In an exemplary embodiment, the body portion includes a handle section that extends distally from the body proximal portion to a handle distal portion to define a longitudinal axis. The handle section is, for example, configured to be gripped by a hand of an installer to facilitate fastening of the fastener. In an exemplary embodiment, the body portion includes a neck section that extends from the handle distal portion to the body distal portion.

The apparatus further includes a head portion that extends distally from the body distal portion and that is configured to engage the fastener. In an exemplary embodiment, the head portion includes a first prong that extends distally from a first prong proximal section that has a first thickness to a first prong distal section that has a second thickness that is less than the first thickness. The head portion further includes a second prong that extends distally from a second prong proximal section that has a third thickness to a second prong distal section that has a fourth thickness that is less than the third thickness. The second prong is spaced apart from the first prong to define a gap therebetween that is configured to receive the fastener. In an exemplary embodiment, the head portion extends distally from the body distal portion to define a second longitudinal axis that is spaced apart from the first longitudinal axis. The neck section is stepped between the first longitudinal axis and the second longitudinal axis.

In an exemplary embodiment, advantageously, by stepping the neck section and, independently, reducing the thicknesses of the prong distal sections of the first and second prongs relative to the thicknesses of the prong proximal sections, an installer can use the apparatus to more efficiently and effectively fasten a fastener to a structure. For example, stepping the neck section such that the first longitudinal axis of the handle section and the second longitudinal axis of the head portion are offset from each other provides additional space between the installer's hand and the structure while the installer is holding the handle of the apparatus during fastening of the fastener to the structure. Moreover, reducing the thicknesses of the prong distal sections of the first and second prongs of the apparatus relative to the thicknesses of the prong proximal sections allows the first and the second prongs to extend further about the fastener for better engagement with the fastener due to the lower profile prong distal sections not crashing against or getting in the way of the fastener while the fastener is being fastened. In an exemplary embodiment, advantageously this provides the installer with better mechanical leverage to prevent unintended movement of the fastener while the fastener is being fastened. As such, the apparatus allows for efficient and ergonomic fastening of fasteners that diminish strain and/or discomfort put on the installer during fastener installation.

Figure 1:
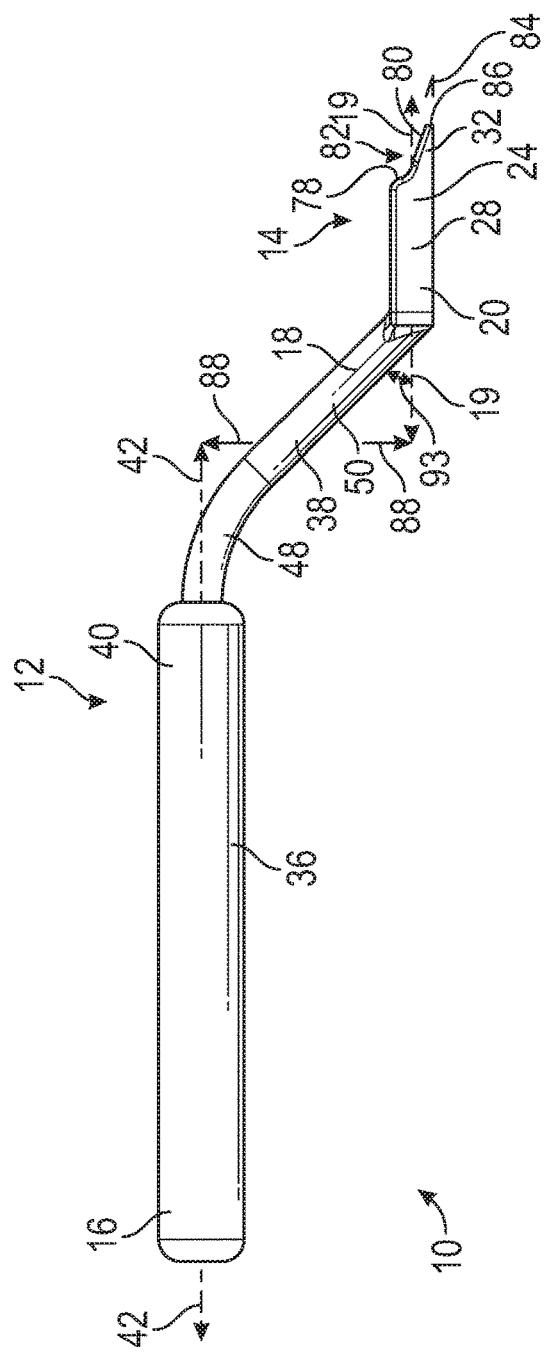
FIG. 1 illustrates a side view of an apparatus for facilitating fastening of a fastener in accordance with an exemplary embodiment.
Figure 2:
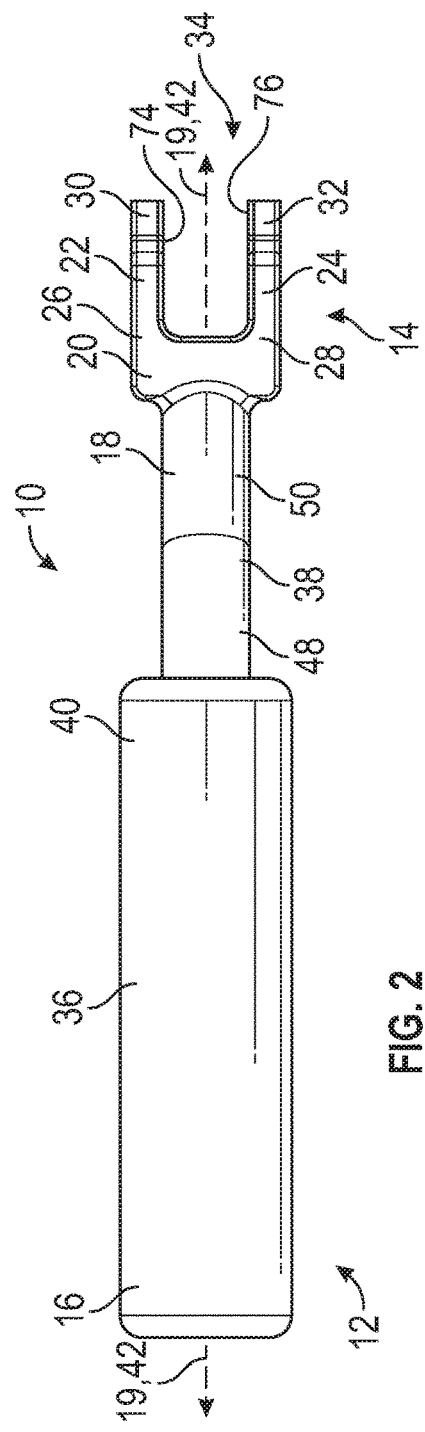
FIG. 2 illustrates a top view of the apparatus for facilitating fastening of a fastener in accordance with an exemplary embodiment.

FIGS. 1-3 illustrate a side view, a top view, and a front view, respectively, of an apparatus 10 in accordance with exemplary embodiments. The apparatus 10 includes a body portion 12 and a head portion 14. The body portion 12 extends distally from a body proximal portion 16 to a body distal portion 18. The head portion 14 extends distally from the body distal portion 18 to define a longitudinal axis (indicated by double-headed arrow 19).

The head portion 14 includes a base section 20 and two prongs 22 and 24. The base section 20 extends distally from the body distal portion 18 to the prongs 22 and 24. Each of the prongs 22 and 24 extend distally from a prong proximal section 26 and 28, respectively, to a prong distal section 30 and 32, respectively. In an exemplary embodiment, the prongs 22 and 24 are spaced apart and substantially parallel. In an exemplary embodiment, the prongs 22 and 24 each have a total length of from about 0.6 to about 1.0 inches. As used herein, the term "about" refers to a margin of error that is encompassed by the numerical value that follows the term "about", such as within a specified manufacturing tolerance of about (e.g., +/−10%, +/−5% or +/−3%).

The prongs 22 and 24 are spaced apart from each other to define a gap 34 therebetween. The gap 34 provides a space (e.g., "U-shaped" space) between the prongs 22 and 24 to receive a fastener as will be discussed in further detail below. In an exemplary embodiment, the gap 34 between the inner sidewalls 74 and 76 of the prongs 22 and 24 is from about 0.4 to about 0.6 inches.

Each of the prong distal sections 30 and 32 have a thickness that is less than the thickness of the corresponding prong proximal section 26 and 28, respectively. The thicknesses of the prong proximal sections 26 and 28 and the prong distal sections 30 and 32 can, independently, be constant or vary distally along a length of the corresponding prong section 26, 28, 30, and/or 32. In an exemplary embodiment, the thicknesses of each of the prong proximal sections 26 and 28 are substantially constant and the thicknesses of each of the prong distal sections 30 and 32 are variable, for example, tapering distally along a corresponding length of the prong distal section 30 and 32. For example and as illustrated, the prong distal sections 30 and 32 each correspondingly include a forward-facing, substantially vertical wall 78 and a chamfered or tapered section 80 extending distally (e.g., tapering inwardly in a distal or forward direction) from just below the forward-facing, substantially vertical wall 78 to form a step or relief clearance 82 between the prong proximal sections 26 and 28 and the tapered sections 80. In an exemplary embodiment, the thicknesses of the prong proximal sections 26 and 28 are substantially identical to each other and the thicknesses of the prong distal sections 30 and 32 are substantially identical to each other. In an exemplary embodiment, the thickness of the base section 20 is substantially identical to the thicknesses of the prong proximal sections 26 and 28. In one example, the thicknesses of the prong proximal sections 26 and 28 and the base section 20 are each from about 0.15 to about 0.35 inches. In another example, the thicknesses of the prong distal sections 30 and 32 step down at the corresponding relief clearance 82 to about 0.1 to about 0.15 inches and taper distally therefrom (e.g., tapered sections 80) at an angle 84 of from about 10 to about 30°, for example about 15 to about 25°, to a point or rounded corner 86 (e.g., radius of about 0.01 to about 0.05 inches) at the distal-most end. In an exemplary embodiment, the relief clearance 82 formed by the corresponding forward-facing, substantially vertical wall 78 defines a vertical drop or step of from about 0.05 to about 0.2 inches between the corresponding prong proximal section 26 and 28 and the tapered section 80 of the corresponding prong distal sections 30 and 32.

In an exemplary embodiment, the body portion 12 of the apparatus 10 includes a handle section 36 and a neck section 38. The handle section 36 extends distally from the body proximal portion 16 to a handle distal portion 40 to define a longitudinal axis (indicated by double-headed arrow 42) that is spaced apart from the longitudinal axis 19. In an exemplary embodiment, the longitudinal axis 42 and the longitudinal axis 19 are substantially parallel. In an exemplary embodiment, the handle section 36 includes a handle inner section 44 and a handle outer section 46 that surrounds the handle inner section 44. The handle inner section 44 is, for example, made of metal and the handle outer section 46 is, for example, made of a polymeric material(s). For instance, the handle inner section 44, the neck section 38 and the head portion 14 may be formed by a 3-D printing process, casting process, or the like to form a monolithic structure that is made of metal (e.g., steel, aluminum), and the handle outer section 46 may be a polymeric material (e.g., elastomeric material), that is wrapped around, cast, or otherwise formed over the handle outer section 46 to provide a gripping surface for a hand of an installer. In an exemplary embodiment, the handle section 36 has a length of from about 4 to about 6 inches.

The neck section 38 extends from the handle distal portion 40 to the body distal portion 18. In an exemplary embodiment, the neck section 38 is stepped between the handle section 36 and the head portion 14. For example, the neck section 38 has a step distance (indicated by double headed arrow 88) between the longitudinal axes 19 and 42 of from about 0.5 to about 2.0 inches that steps or otherwise offsets the handle section 36 and the head portion 14. The neck section 38 includes a neck proximal section 48 and a neck distal section 50. The neck proximal section 48 extends distally from the handle distal portion 40 and the neck distal section 50 extends distally from the neck proximal section 48 to the head portion 14.

In an exemplary embodiment, the neck distal section 50 is slanted relative to the longitudinal axis 19 and the longitudinal axis 42. For example, the neck distal section 50 is positioned at an angle 93 of from about 30 to about 60° such as about 45° relative to the longitudinal axis 19. In an exemplary embodiment, the neck proximal section 48 is curved, extending from the handle distal portion 40 to the neck distal section 50.

Figure 4:
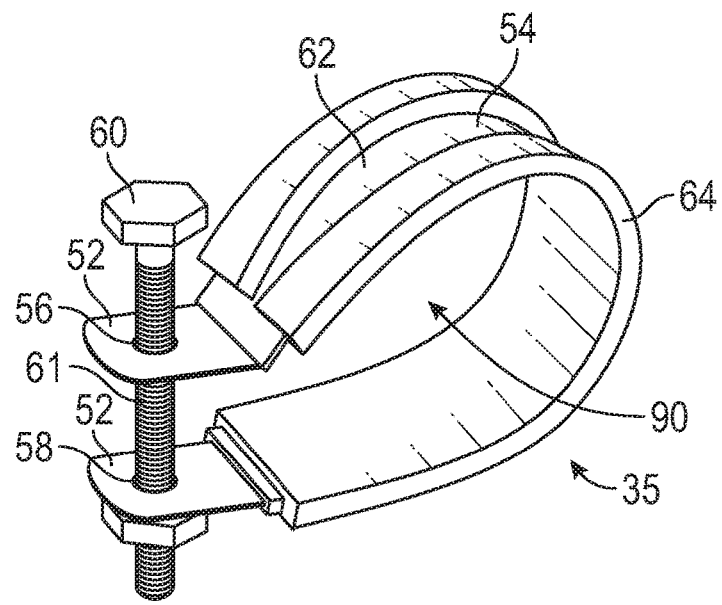
FIG. 4 illustrates a perspective view of a fastener in accordance with an exemplary embodiment.
Figure 5:
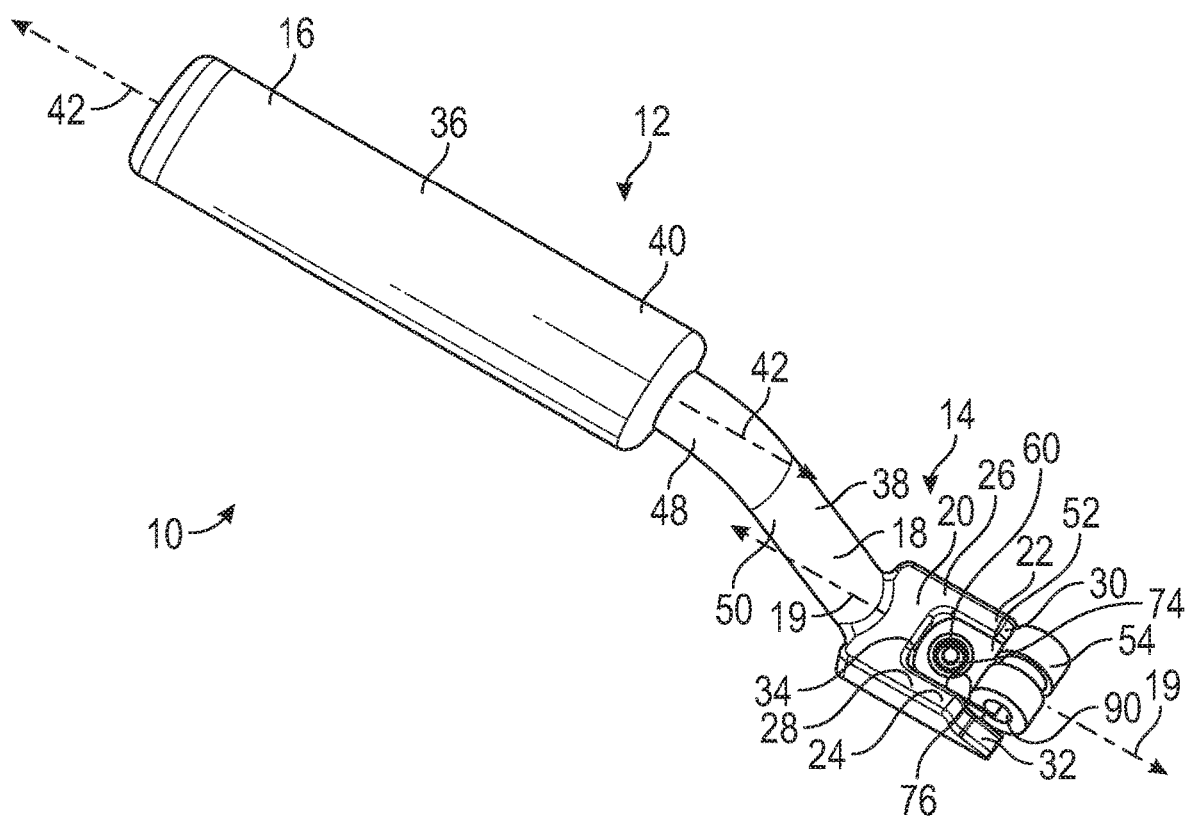
FIG. 5 illustrates a perspective view of an apparatus interfacing with a fastener in accordance with an exemplary embodiment.

Referring to FIG. 4, a perspective view of a fastener 35 in accordance with an exemplary embodiment is shown. As illustrated, in an exemplary embodiment, the fastener 35 is configured as a p-clamp fastener that includes a ring section 54 and clamp sections 52 that extend as tabs or flanges from opposing ends of the ring section 54. The clamp sections 52 define holes 56 and 58 formed therethrough that are configured to receive a fastener body 61 (e.g., shaft portion) of a fastener 60 (e.g., threaded fastener). The ring section 54 includes an inner ring portion 62 and an outer ring portion 64 that at least partially surrounds the inner ring portion 62. In an exemplary embodiment, the outer ring portion 64 is made of a polymeric material such as, for example, rubber or other elastomeric material. When the clamp sections 52 are clamped together with the fastener 60, the ring section 54 closes or otherwise restricts to form a ring opening 90 for retaining an object, for example a flexible structure such as wiring or the like Referring to FIG. 5, a perspective view of the apparatus 10 interfacing with the fastener 35 in accordance with an exemplary embodiment is shown. In an exemplary embodiment, for fastening, the apparatus 10 engages the fastener 35 by positioning the clamp section 52 of the fastener 35 in the gap 34 between the sidewalls 74 and 76 of the prongs 22 and 24 such that the prong proximal sections 26 and 28 engage the sidewalls of the clamp sections 52 and the prong distal sections 30 and 32 extend distally past the clamp sections 52 adjacent to the ring section 54 below the ring opening 90.

Figure 6:
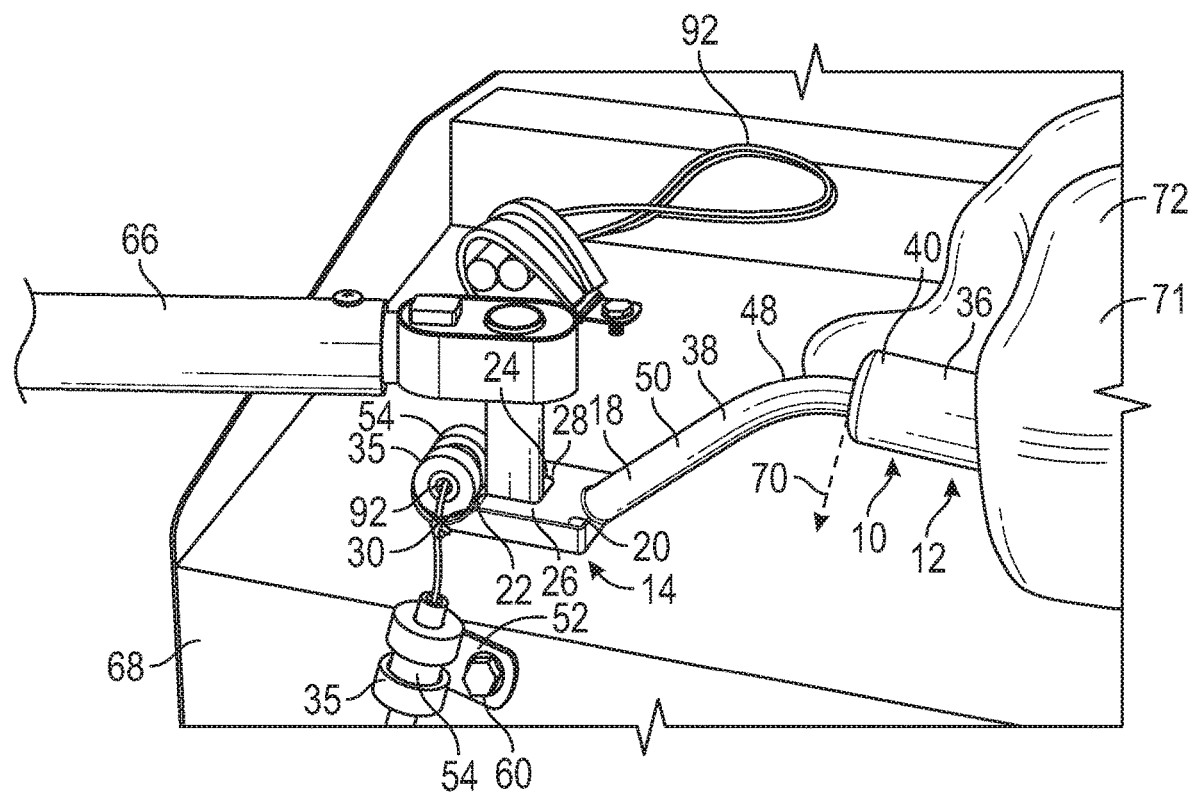
FIG. 6 illustrates a perspective view of an apparatus fastening a fastener in accordance with an exemplary embodiment.

FIG. 6 illustrates a perspective view of the apparatus 10 fastening of the fastener 35 in accordance with an exemplary embodiment. Referring to FIGS. 1-6, the apparatus 10 is used by an installer 71 to fasten the fastener 35 to a structure 68. In an exemplary embodiment, the structure 68 is a relatively rigid structure such as a substrate, hard panel, or the like configured for carrying a wire harness 92. For example, the structure 68 may be formed of a relatively rigid material such as a plastic or polymeric material, a fiber reinforced plastic (FRP) material, a metal material such as steel, aluminum, or the like, or other rigid material.

In an exemplary embodiment and as discussed above, the apparatus 10 engages the fastener 35 by positioning the clamp section 52 of the fastener 35 in the gap 34 between the prongs 22 and 24 to hold the fastener 35 steady against the structure 68 at a predetermined or desired location. As illustrated, the prong proximal sections 26 and 28 engage the sidewalls of the clamp sections 52 and the prong distal sections 30 and 32 extend distally past the clamp sections 52 adjacent to the ring section 54 below the ring opening 90. Disposed through the ring opening 90 is the wire harness 92. Advantageously, the relief clearance 82 formed by the forward-facing, substantially vertical walls 78 and the tapered sections 80 of the prong distal sections 30 and 32 provides clearance or space for the ring section 54 of the fastener 35 and the wire harness 92 so that the prongs 22 and 24 can extend more fully about the fastener 35 for better engagement with the fastener 35 without the prongs 22 and 24 crashing against or getting in the way of the ring section 54 and/or the wire harness 92.

A wrench 66, for example a socket wrench or the like, is used to rotate the head of the fastener 60 and force the fastener body 61 down through the holes 56 and 58 and into the structure 68 to fasten the fastener 35 to the structure 68. This pulls or constricts the ring section 54 about the wire harness 90 to firmly hold the wire harness 90 to the structure 68. A downward force (indicated by single-headed arrow 70) is applied by the hand 72 of the installer 71 to maintain contact between the head portion 14 of the apparatus 10 and the structure 68 while the prongs 22 and 24 prevent rotational motion of the fastener 35 while it is fastened to the structure 68.

Figure 7:
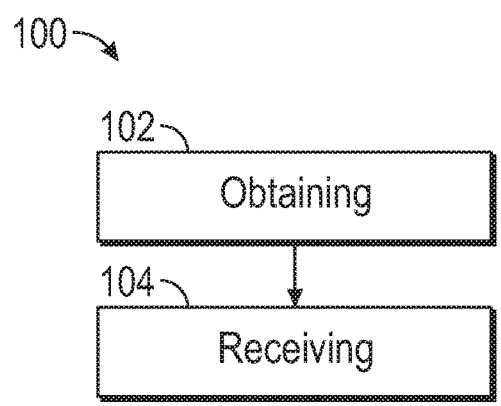
FIG. 7 illustrates a block diagram of a method for facilitating fastening of a fastener in accordance with an exemplary embodiment.

Referring to FIG. 7, a method 100 for facilitating fastening of a fastener in accordance with an exemplary embodiment is provided. The method 100 includes obtaining (STEP 102) an apparatus. For example, the apparatus may be obtained by forming the apparatus, procuring the apparatus, and/or locating the apparatus.

The apparatus includes a body portion that extends distally from a body proximal portion to a body distal portion. A head portion extends distally from the body distal portion. The head portion includes a first prong that extends distally from a first prong proximal portion that has a first thickness to a first prong distal portion that has a second thickness that is less than the first thickness. A second prong extends distally from a second prong proximal portion that has a third thickness to a second prong distal portion that has a fourth thickness that is less than the third thickness. The second prong is spaced apart from the first prong to define a gap therebetween.

A portion of the fastener is received (STEP 104) into the gap such that the first prong and the second prong engage the portion of the fastener. In an exemplary embodiment, the fastener is a p-clamp that includes a clamp and a threaded fastener that is coupled to the clamp. In an exemplary embodiment, receiving includes receiving the portion of the clamp into the gap.

In an exemplary embodiment, the method further comprises turning the threaded fastener while holding the clamp stationary with the apparatus. In one example, the threaded fastener is turned using a socket wrench.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for facilitating fastening of a fastener, the apparatus comprising:
    a body portion that extends distally from a body proximal portion to a body distal portion; and
    a head portion that extends distally from the body distal portion, the head portion comprising:
    a first prong that extends distally along a first corresponding prong longitudinal axis from a first prong proximal section that has a first thickness to a first prong distal section that has a second thickness that is less than the first thickness; and
    a second prong that extends distally along a second corresponding prong longitudinal axis from a second prong proximal section that has a third thickness to a second prong distal section that has a fourth thickness that is less than the third thickness, wherein the second prong is spaced apart from the first prong to define a gap therebetween that is configured to receive the fastener, wherein the body portion includes a handle section that is disposed proximal from the head portion and that extends distally from the body proximal portion to a handle distal portion to define a first longitudinal axis, and wherein the first and second corresponding prong longitudinal axes are substantially parallel to each other and independently to the first longitudinal axis.

2. The apparatus of claim 1, wherein the body portion further includes a neck section that extends from the handle distal portion to the body distal portion, wherein the head portion extends distally from the body distal portion to define a second longitudinal axis that is spaced apart from the first longitudinal axis, and wherein the neck section is stepped between the first longitudinal axis and the second longitudinal axis.

3. The apparatus of claim 2, wherein the first longitudinal axis and the second longitudinal axis are substantially parallel.

4. The apparatus of claim 3, wherein the neck section includes a neck proximal section that extends distally from the handle distal portion, wherein the neck section further includes a neck distal section that extends distally from the neck proximal section to the head portion, and wherein the neck distal section is slanted relative to the first longitudinal axis and the second longitudinal axis.

5. The apparatus of claim 4, wherein the neck proximal section is curved to extend from the handle distal portion to the neck distal section.

6. The apparatus of claim 5, wherein the neck distal section is positioned at an angle of from about 30 to about 60° relative to the second longitudinal axis.

7. The apparatus of claim 6, wherein the angle is about 45°.

8. The apparatus of claim 1, wherein the first prong and the second prong are substantially parallel.

9. The apparatus of claim 1, wherein the first thickness and the third thickness are substantially identical, and wherein the second thickness and the fourth thickness are substantially identical.

10. The apparatus of claim 9, wherein the first thickness and the third thickness are substantially constant along a first length and a second length of the first prong proximal section and the second prong proximal section, respectively.

11. The apparatus of claim 10, wherein the third thickness and the fourth thickness are variable, tapering distally along a third length and a fourth length of the first prong distal section and the second prong distal section, respectively.

12. The apparatus of claim 11, wherein the head portion includes a base section that extends distally from the body distal portion to the first prong proximal section and the second prong proximal section.

13. The apparatus of claim 12, wherein the base section has a thickness substantially identical to the first thickness and the third thickness.

14. The apparatus of claim 9, wherein the first thickness and the third thickness are each from about 0.15 to about 0.35 inches.

15. The apparatus of claim 9, wherein the second thickness and the fourth thickness are each from about 0.1 to about 0.15 inches.

16. The apparatus of claim 1, wherein the gap is from about 0.4 to about 0.6 inches.

17. The apparatus of claim 16, wherein the first prong has a first total length and the second prong has a second total length, and wherein the first total length and the second total length are each from about 0.6 to about 1.0 inches.

18. An apparatus for facilitating fastening of a fastener, the apparatus comprising:
    a body portion that extends distally from a body proximal portion to a body distal portion, the body portion comprising:
    a handle section that extends distally from the body proximal portion to a handle distal portion to define a first longitudinal axis; and
    a neck section that extends from the handle distal portion to the body distal portion; and a head portion that extends distally from the body distal portion to define a second longitudinal axis, the head portion comprising:

a first prong that extends distally along a first corresponding prong longitudinal axis from a first prong proximal section that has a first thickness to a first prong distal section that has a second thickness that is less than the first thickness; and a second prong that extends distally along a second corresponding prong longitudinal from a second prong proximal section that has a third thickness to a second prong distal section that has a fourth thickness that is less than the third thickness, wherein the second prong is spaced apart from the first prong to define a gap therebetween that is configured to receive the fastener, wherein the first thickness and the third thickness are substantially identical, wherein the second thickness and the fourth thickness are substantially identical, wherein the neck section is stepped between the first longitudinal axis and the second longitudinal axis, wherein the body portion includes a handle section that is disposed proximal from the head portion, and wherein the first and second corresponding prong longitudinal axes are substantially parallel to each other and independently to the first longitudinal axis.

19. A method for facilitating fastening of a fastener, the method comprising the steps of:

obtaining an apparatus, the apparatus comprising:

a body portion that extends distally from a body proximal portion to a body distal portion; and a head portion that extends distally from the body distal portion, the head portion comprising:

a first prong that extends distally along a first corresponding prong longitudinal axis from a first prong proximal portion that has a first thickness to a first prong distal portion that has a second thickness that is less than the first thickness; and a second prong that extends distally along a second corresponding prong longitudinal from a second prong proximal portion that has a third thickness to a second prong distal portion that has a fourth thickness that is less than the third thickness, wherein the second prong is spaced apart from the first prong to define a gap therebetween, and wherein the body portion includes a handle section that is disposed proximal from the head portion and that extends distally from the body proximal portion to a handle distal portion to define a first longitudinal axis, and wherein the first and second corresponding prong longitudinal axes are substantially parallel to each other and independently to the first longitudinal axis; and receiving a portion of the fastener into the gap such that the first prong and the second prong engage the portion of the fastener.

20. The method of claim 19, wherein the fastener is a p-clamp that comprises a clamp and a threaded fastener that is coupled to the clamp, wherein receiving comprises receiving the portion of the clamp into the gap, and wherein the method further comprises the steps of turning the threaded fastener while holding the clamp stationary with the apparatus.

* * * * *